Figures 1, 26:
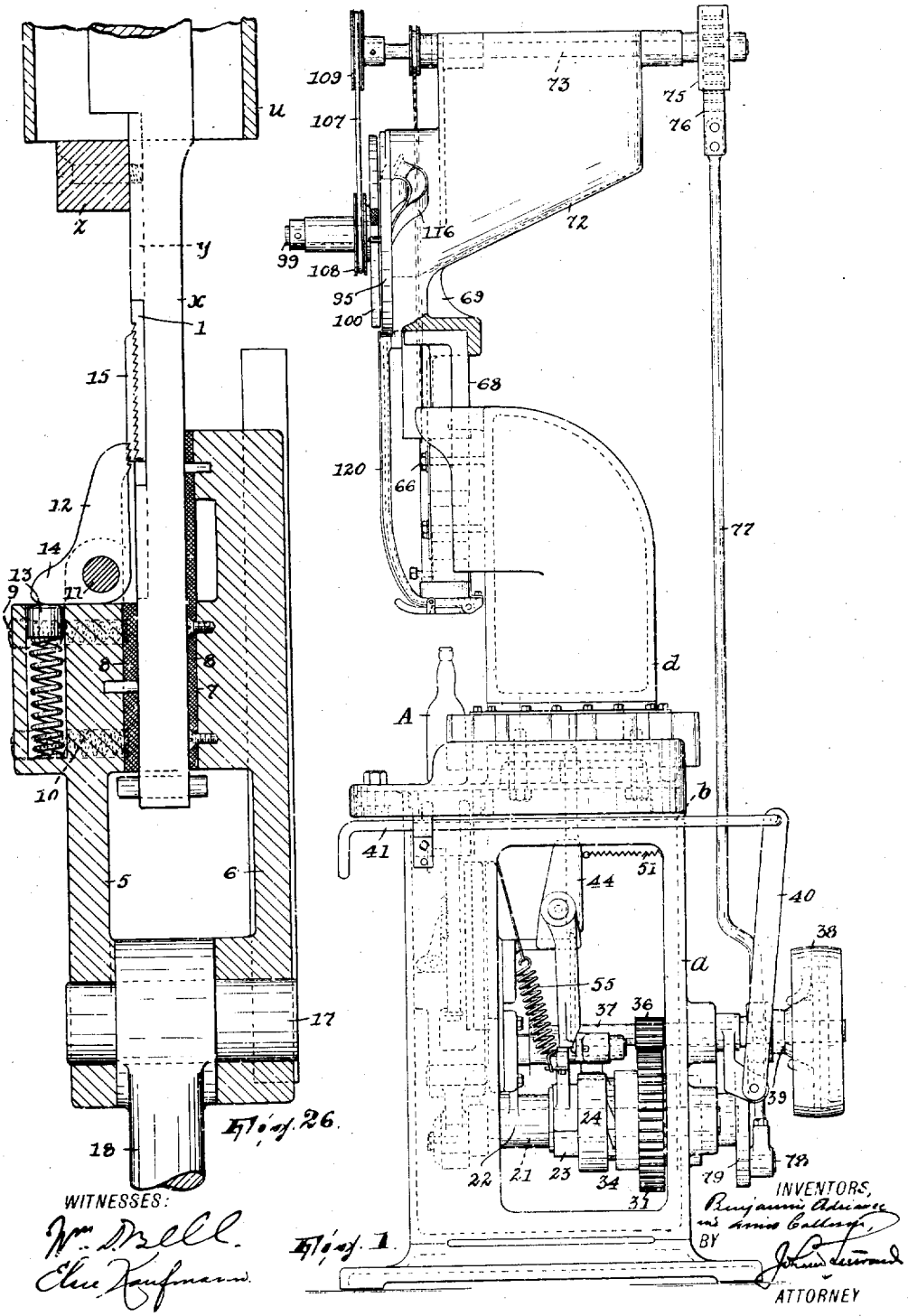

B. ADRIANCE & A. CALLESON.

BOTTLE CAPPING MACHINE.

APPLICATION FILED FEB. 11, 1910.

Reissued Oct. 1, 1912.

13,468.

7 SHEETS—SHEET 1.

WITNESSES:

Wm. D. Bell.

Elec Kaufmann.

INVENTORS,

Benjamin Adriance and Amos Calleson,

BY

John Wm. Sherman

ATTORNEY

B. ADRIANCE & A. CALLESON.
BOTTLE CAPPING MACHINE
APPLICATION FILED FEB. 11, 1910.
Reissued Oct. 1, 1912.
13,468.
7 SHEETS—SHEET 2.
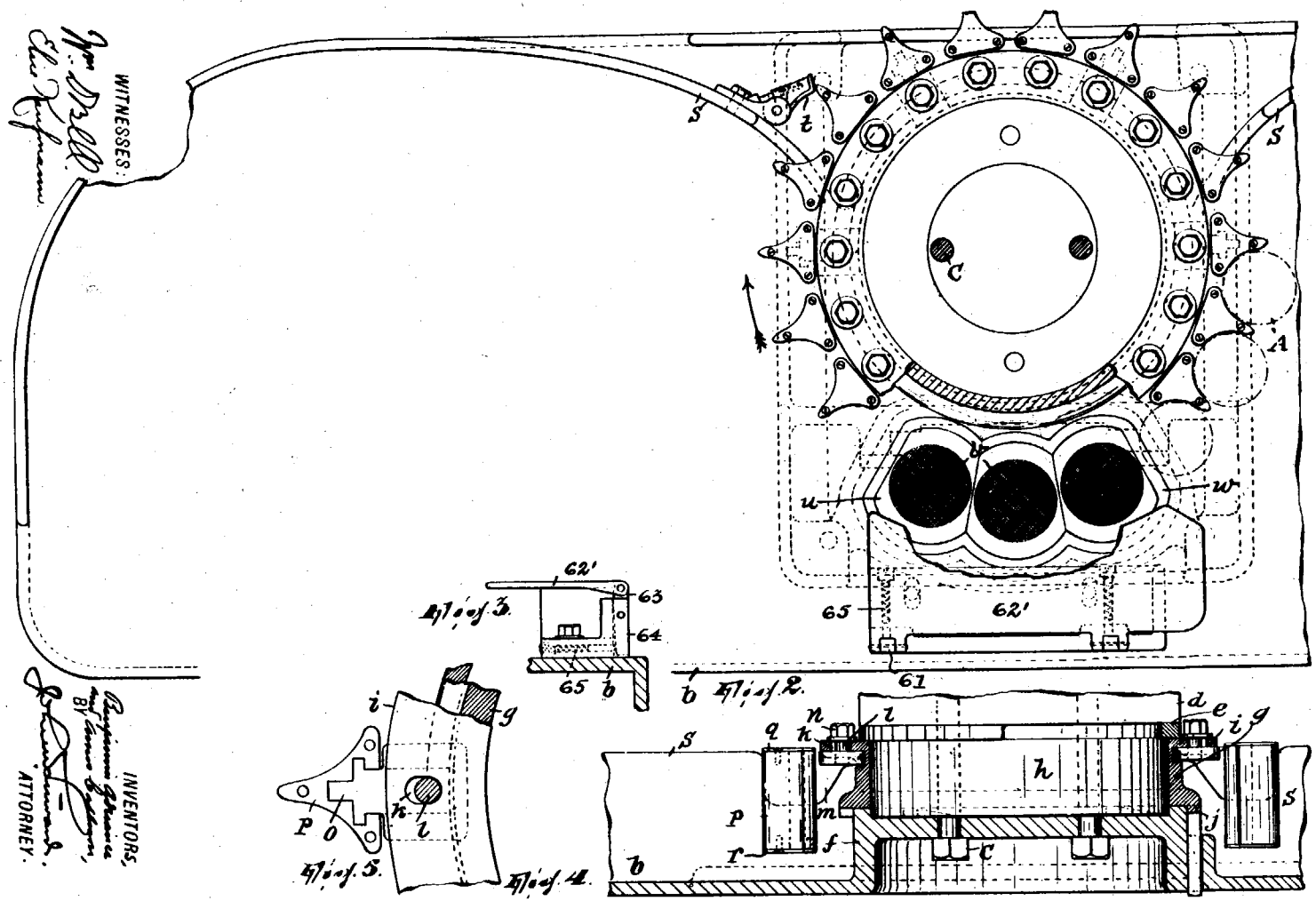
WITNESSES:
Wm. D. Bell.
Elie Kaufmann.
INVENTORS,
Benjamin Adriance
and Amos Calleson,
BY
John Wm. Linard.
ATTORNEY.

B. ADRIANCE & A. CALLESON.
BOTTLE CAPPING MACHINE.
APPLICATION FILED FEB. 11, 1910.
Reissued Oct. 1, 1912.
13,468.
7 SHEETS—SHEET 3.
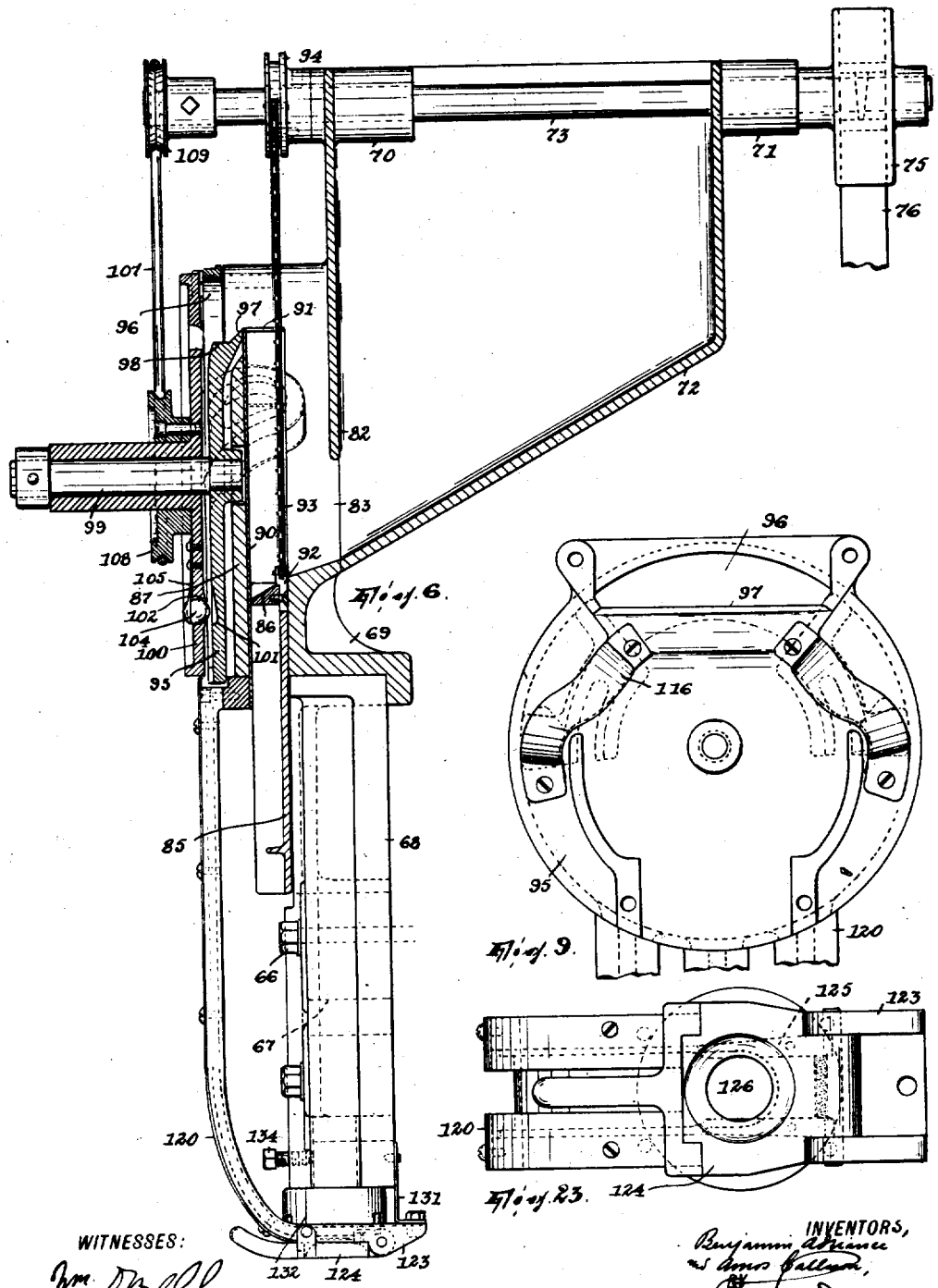
WITNESSES:
Wm. O. Bell.
Elsie Kaufmann.
INVENTORS,
Benjamin Adriance
and Amos Calleson,
By
John Schwarz.
ATTORNEY.

B. ADRIANCE & A. CALLESON.

BOTTLE CAPPING MACHINE.

APPLICATION FILED FEB. 11, 1910.

Reissued Oct. 1, 1912.

13,468.

7 SHEETS—SHEET 4.

WITNESSES:

Wm. Dzell.

Elie Kaufmann.

INVENTORS,

Benjamin Adriance

& Amos Calleson,

BY

J. Thos. Stewart

ATTORNEY

B. ADRIANCE & A. CALLESON.

BOTTLE CAPPING MACHINE.

APPLICATION FILED FEB. 11, 1910.

Reissued Oct. 1, 1912.

13,468.

7 SHEETS—SHEET 5.

WITNESSES:

Wm. Dell.

Elsie Kaufmann.

INVENTORS,

Benjamin Adriance and Amos Calleson,

BY

John Underwood.

ATTORNEY.

B. ADRIANCE & A. CALLESON.
BOTTLE CAPPING MACHINE.
APPLICATION FILED FEB. 11, 1910.
Reissued Oct. 1, 1912.
13,468.
7 SHEETS—SHEET 6.
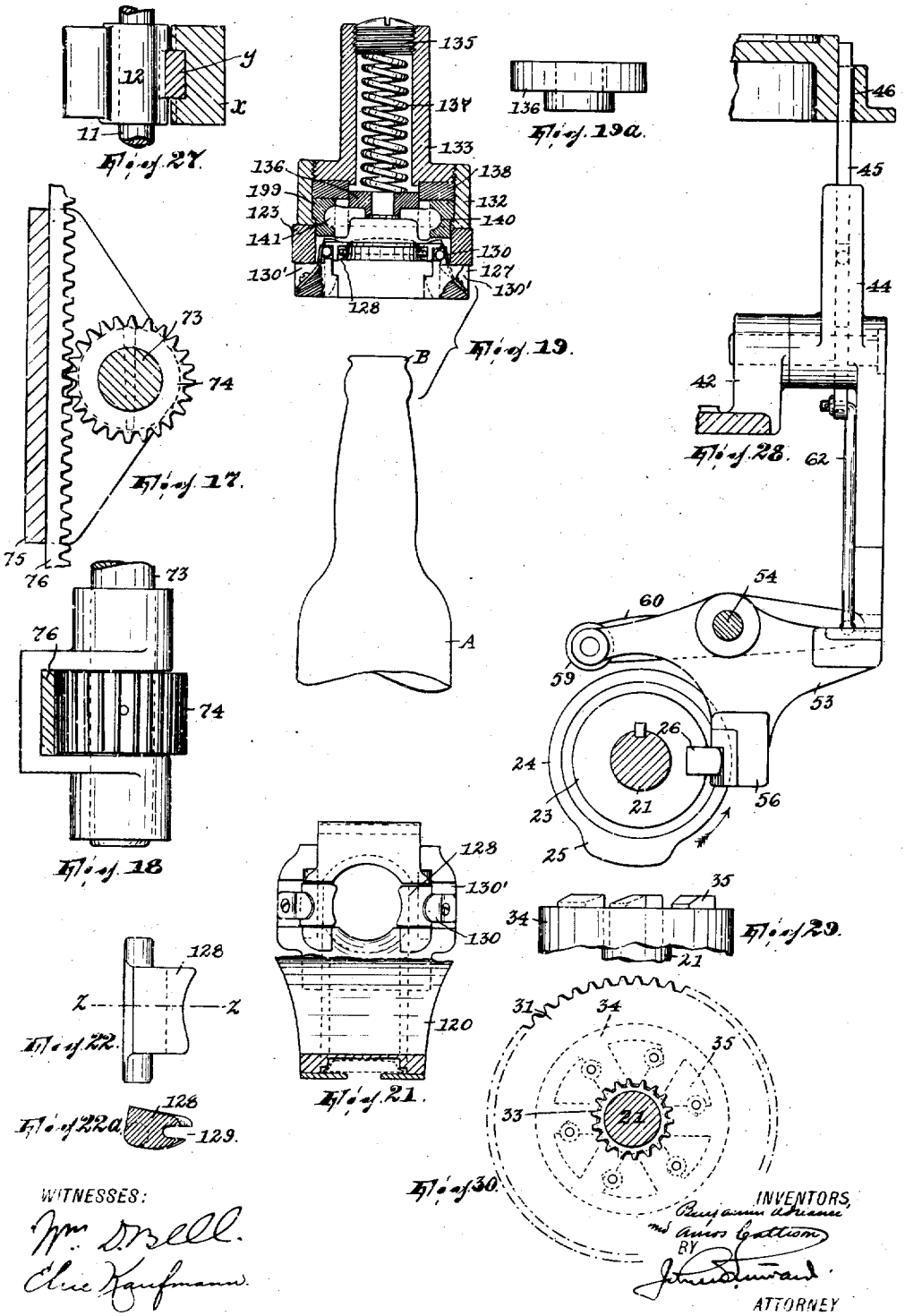
WITNESSES:
Wm. Dell.
Chas. Kaufmann.
INVENTORS,
Benjamin Adriance
and Amos Calleson
BY
John E. Ward.
ATTORNEY

B. ADRIANCE & A. CALLESON.

BOTTLE CAPPING MACHINE.

APPLICATION FILED FEB. 11, 1910.

Reissued Oct. 1, 1912.

13,468.

7 SHEETS—SHEET 7.

WITNESSES

W. D. Bell.
Elias Kaufman.

Inventors: Benjamin Adriance and Amos Calleson,

BY J. Rumsey Howard, ATTORNEY.

UNITED STATES PATENT OFFICE.

BENJAMIN ADRIANCE AND AMOS CALLESON, OF BROOKLYN, NEW YORK; SAID CALLESON ASSIGNOR TO SAID ADRIANCE.

BOTTLE-CAPPING MACHINE.

13,468. Specification of Reissued Letters Patent. Reissued Oct. 1, 1912.

Original No. 913,182, dated February 23, 1909, Serial No. 447,968. Application for reissue filed February 11, 1910. Serial No. 543,417.

*To all whom it may concern:*

Be it known that we, BENJAMIN ADRIANCE and AMOS CALLESON, citizens of the United States, residing in Brooklyn, borough of Brooklyn, and State of New York, have invented certain new and useful Improvements in Bottle-Capping Machines; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to bottle sealing machines and the like and it consists in certain improvements whereby the operation of closing or sealing bottles or the like is considerably simplified and expedited, the manual labor required resolving itself merely into the workman moving the bottles to and away from the sealing position.

The salient features of the invention are the means whereby the closures, contained in a suitable receptacle, are fed to the position for sealing in correct relation with respect to the mouths of the bottles; the means whereby the bottles and caps are brought into sealing relation with each other, such means being so constructed and adapted to operate that varying heights of bottles are compensated for; and the means whereby the means aforesaid are made to coöperate with each other in the orderly working of the machine.

Figure 11:
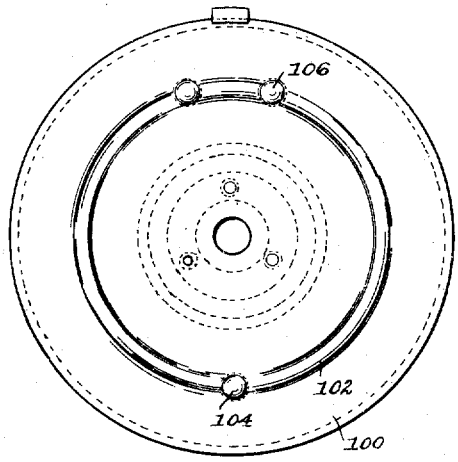
Figure 10:
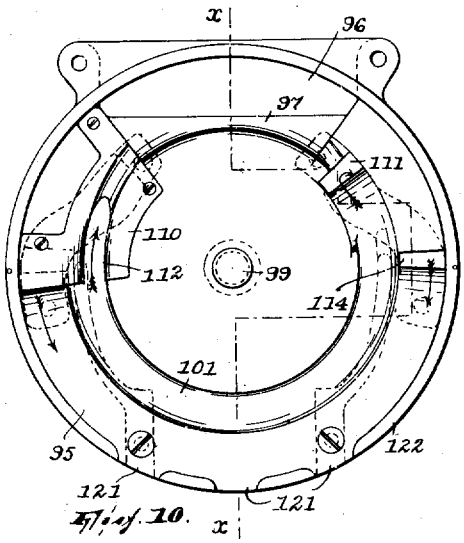
Figure 7:
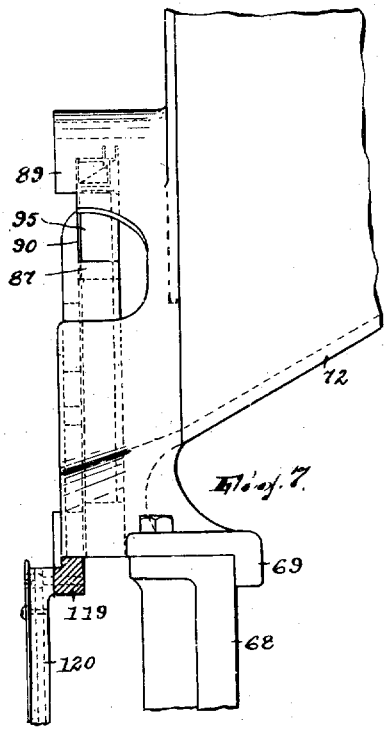
Figure 8:
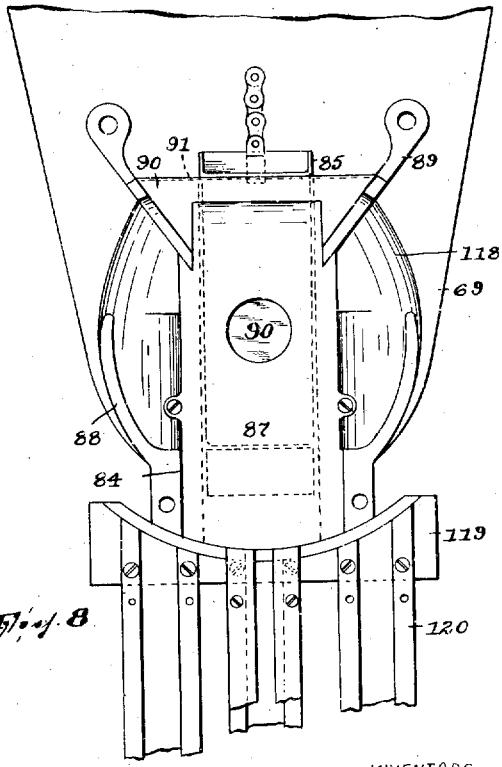
Figure 12:
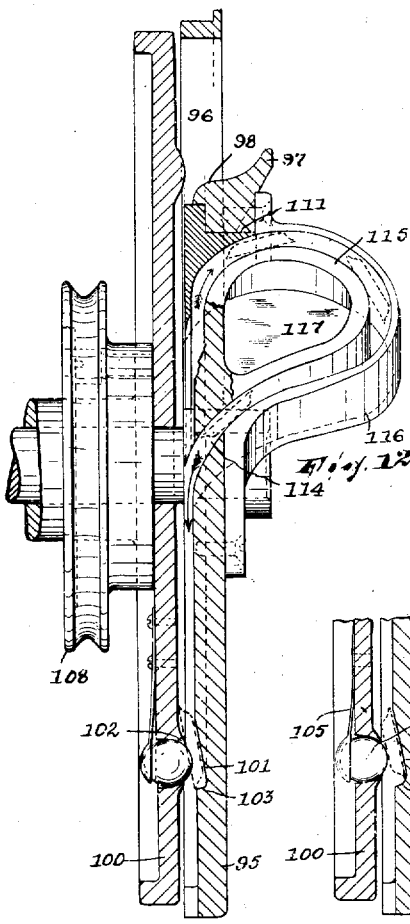
Figure 14:
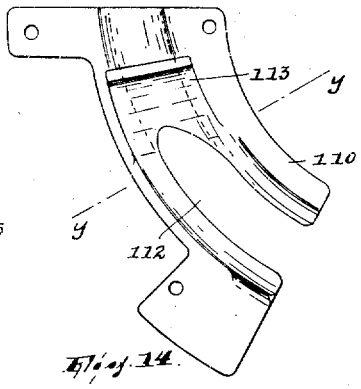
Figure 15:
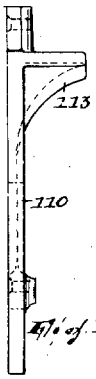
Figure 16:
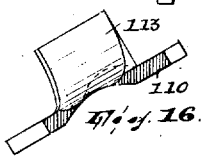
Figure 20:
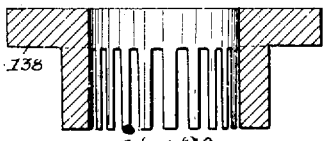
Figure 13:
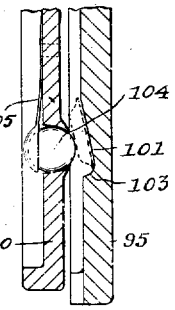
Figure 31:
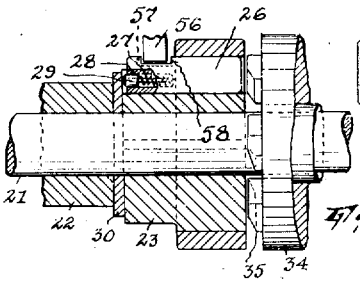
Figure 32:
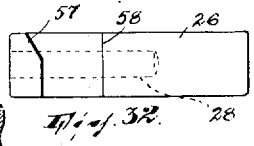
Figure 25:
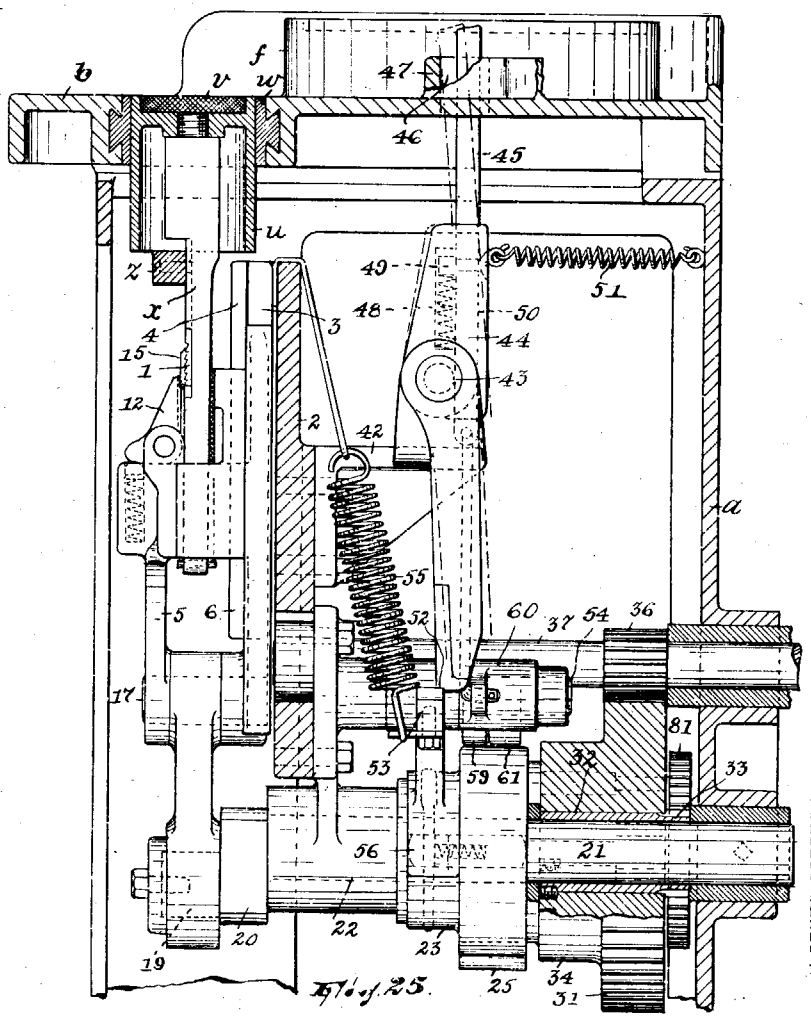
Figure 24:
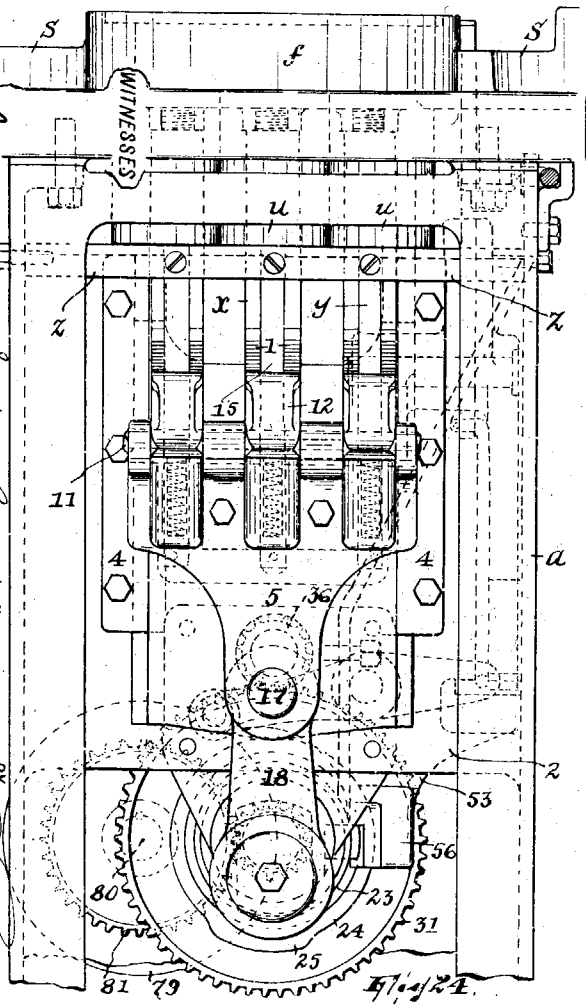

The invention will be found fully illustrated in the accompanying drawings, wherein, Figure 1 is a side view of the improved machine; Fig. 2 is a plan view of the table of the machine with the head thereof and certain other parts removed and others broken away; Fig. 3 shows a detail of Fig. 2, illustrating the bottle guide which coacts with a certain turret in the positioning of the bottles for the sealing operation; Fig. 4 is a vertical sectional view in the plane of the bolts $c$ in Fig. 2; a fragment of the base of the head being shown and certain parts appearing in elevation; Fig. 5 shows a detail of the turret appearing in Figs. 3 and 4; Fig. 6 is a view showing the cap feeding mechanism detached and the upper portion thereof approximately in central vertical section in the plane of the shaft 99; Fig. 7 is a side view, enlarged, of the cap feeding mechanism with the cap selecting and rectifying mechanism thereof removed; Fig. 8 is a front view of what is shown in Fig. 7; Fig. 9 is a rear elevation of the part of the cap rectifying mechanism which is bolted to the front face of the portion of the feeding mechanism shown in Figs. 7 and 8; Fig. 10 is a front view of what is shown in Fig. 9; Fig. 11 is a rear view of the rotating member of the cap rectifying mechanism; Fig. 12 is a sectional view of the cap rectifying mechanism approximately on the line $x$—$x$ of Fig. 10, and showing how a cap properly disposed therein will be passed thereby; Fig. 13 is a fragment of what is shown in Fig. 12 showing how a cap improperly disposed therein will be rejected or checked thereby; Fig. 14 shows a detail of the cap rectfying mechanism, illustrating one of the deflector plates; Figs. 15 and 16 are a side view and a sectional view on the line $y$—$y$ of Fig. 14, respectively, of what is shown in Fig. 14; Figs. 17 and 18 are vertical and horizontal sectional views, respectively, of the rack and pinion part of the means for oscillating the rock shaft of the cap feeding mechanism; Fig. 19 shows one of the sealing-heads and a certain block 123 in section in a transverse vertical plane through the vertical axis of the sealing head, and also a modified form of the cap-holding block which is pivoted to block 123, said cap-holding block appearing in front elevation with its front corners broken away back to certain recesses 130′ therein. Fig. 19ª is a side elevation of the sliding plug of the sealing head; Fig. 20 is a vertical central sectional view of a slitted flanged ring shown in Fig. 19; Fig. 21 is a view showing, in plan, the cap-holding block, appearing in Fig. 19, and, partly in section, a fragment of the corresponding chute of the feeding mechanism; Fig. 22 is a plan view of a clip shown in Fig. 21, and Fig. 22ª a sectional view on line $z$—$z$ of Fig. 22; Fig. 23 is an underneath view of what is shown in Fig. 6; Fig. 24 is a view in front elevation of the lower part of the machine, showing principally the mechanism for elevating the bottles to the sealing position; Fig. 25 is a view partly in side elevation and partly in central vertical section, of what is shown in Fig. 24; Fig. 26 is a view, partly in side elevation and partly in central vertical section, enlarged, of the bottle elevating means shown in Fig. 24; Fig. 27 is a horizontal sectional view taken through one of the stems *x* and just above the corresponding pawl 12 in Fig. 26; Fig. 28 shows in front elevation, partly in section, a part of the mechanism whereby the operation of the machine is controlled from the manually rotated bottle turret; Fig. 29 shows a fragment of one member of a certain clutch in plan; Fig. 30 shows said clutch member and other parts connected therewith in side elevation; Fig. 31 shows the clutch mechanism in horizontal central section from beneath; and, Fig. 32 is a detail of said clutch mechanism, illustrating a certain bolt 26.

*a* is a rectangular frame surmounted by the table *b*, the table having secured to it substantially centrally thereof by bolts *c* the head *d*; the lower portion of the head is surrounded by a Babbit metal ring *e* between which and a boss *f* which directly supports the head an annular turret *g* is disposed, so as to rotate on the cross-sectionally circular base *h* of the head. This turret has a lateral flange *i* and a circular series of downwardly projecting ratchet teeth *j*, there being as many such teeth as there are intermittent rotary advances necessary to turn the turret through one complete cycle of movement, it being remarked that the turret is turned by hand intermittently by the attendant and that this is the only part which it is required for him to operate. The turret flange *i* has radial slots *k* receiving the threaded studs *l* of the carriers *m*, the carriers being held in place by the nuts *n*; each carrier has the vertically flanged portion *o* receiving a block *p* which is vertically slotted to receive and fit it (Fig. 5) and which may slide up and down thereon, its slot being covered at both ends by the plates *q* and *r* secured against the top and under faces of the block. The blocks *p* are suitably recessed to receive and fit a bottle A; they are normally depressed, but are capable of moving up with the bottles when the same are raised or for the purpose of access to a certain member which coöperates with the teeth *j*.

In the machine illustrated there are eighteen of the blocks *p*, and the attendant moves three bottles at a time into the sockets afforded by the blocks and turns the turret clockwise in the direction of the arrow in Fig. 2 until the bottles stand in front of the turret. The filled or unclosed bottles stand on the table at the right of the turret, and as the bottles are sealed they are moved to the left of the turret. A curved wall *s*, integral with the table, extends from the turret to the right and left thereof, serving to prevent the bottles from being pushed off the back of the table. In order to prevent action of the turret, the left hand wall *s* may have pivoted to it a spring actuated pawl *t* which projects within the circle of movement of the ends of the blocks *p*, coöperating therewith to check the back action of the turret while allowing its advance movement. Three cylindrical plungers *u* carrying the elastic pads *v* are arranged in the arc of a circle concentric with the axis of the turret in front of the latter, the same being movable vertically in bearings *w* in the table. These plungers carry the downwardly extending stems *x*, each vertically grooved at the front and receiving a vertical strip *y* which is fixed to and depends from a stationary cross bar *z* secured in the frame *a* in front of the stems *x*. Toothed racks 1 are let into each stem *x* one at each side of the strip *y*.

The frame *a* has the vertical web 2 formed with vertical parallel ribs 3 against which are bolted strips 4 producing with said ribs opposed guide-ways for a vertically movable thrust block (Figs. 24, 25 and 26) comprising front and rear members 5 and 6 bolted together. Bores 7 are formed vertically in the upper part of the thrust block, the same being lined with fiber 8 or other substance adapted to create friction. The thus lined bores receive the stems *x* of plungers *u*, in such manner that the parts cannot move relatively to each other except resistance overcomes the friction induced. The frictional action may be adjusted by means of set screws 9 bearing against springs 10 arranged in the front part 5 of the thrust block and bearing against the front fiber pieces 8. On a pin 11 in the part 5 are pivoted the pawls 12 having their upper ends toothed or otherwise formed so as to engage with the racks 1 in the corresponding stems *x*, the points of the pawls being held inwardly by spring pressed plugs 13 arranged in part 5 and bearing against the toes 14 of the pawls. Each strip *y* has its lower front face formed with an elevation 15. When the thrust block rises its frictional engagement with the stems *x* causes it to raise the plungers until the resistance from above, exerted by the properly positioned caps on the bottles resting on the pads *v*, becomes so great that the plungers will no longer partake of the rising action of the thrust block, whereupon the pawls, which approximately to this time have been held out of engagement with the toothed racks 1 by the elevations 15 of the strips *y*, are now, having moved above said elevations, permitted to move into engagement with said racks and from now on positively continue the remaining upward movement of the plungers. When the thrust block returns it of course draws the plungers *x* down with it until each plunger impinges against the cross-bar *z*, which thus serves to level up the plungers and readjust them with respect to the thrust-block preparatory to the next sealing or closing operation.

The thrust block is reciprocated as follows: A pin 17 connects its members 5 and 6 and on this is pivoted one end of a pitman 18 the other end of which is pivoted to a crank pin 19 of a crank 20 on a shaft 21 which is journaled in the back of the machine and in a bracket 22 depending from the web 2. On this shaft is keyed a clutch member 23 onto which is shrunk a band 24 having a hump 25 and thus making the clutch member also a cam. In this clutch member, parallel with its axis, is arranged a longitudinal sliding bolt 26 normally held with its right hand end, in Fig. 31, projecting from the corresponding face of the clutch member by a spiral spring 27 in a bore 28 in the bolt, said spring being interposed between the end of the bore and the head of a stem 29 which in turn abuts against a disk 30 interposed between the bearing 22 and the clutch member. Between the bearing for shaft 21 in the back of the frame and the clutch member 23 is arranged a gear 31 fixed on a sleeve 32 which rotates on shaft 21 and has its rear end formed as a pinion 33. The hub 34 of the gear has on its face adjoining the clutch member 23 the blocks or teeth 35, making said hub a clutch member complementary to clutch member 23. The gear 31 meshes with a pinion 36 fixed on the drive shaft 37 which is journaled in bracket 22 and the back of the frame *a* and which carries a pulley 38 which rotates freely on the shaft under the drive of its belt (not shown) but may be made to assume a fixed relation to the shaft by a suitable clutch 39 operated by a lever 40 having a pull 41 which extends toward the front of the machine. So long as the clutch 39 transmits power from pulley 38 to shaft 37 (which is constantly, under the normal working of the machine) the gear 31 will be rotating; and so long as the bolt 26 occupied its normal position interlocking the clutch members. the thrust block would be reciprocated. But the thrust block only moves up and down once for each intermittent advance of the turret, and this is effected as follows:

A bracket 42 is bolted to the web 2 and on a stud 43 projecting therefrom is fulcrumed a lever 44; this lever comprises an extension 43 which projects through an opening 46 in the table at one side of the turret, being adapted, when its upper end is engaged by one of the teeth *j* on the turret, to abut against a stop 47 formed by the forward side of the opening 46, and this extension is normally held up in the path of the teeth *j* by a spiral spring 48 arranged in the lever 44 and bearing against a stud 49 on the extension 45, which is guided in a longitudinal bore 50 of the lever 44. The lever 44 has its upper end normally pulled to the right as shown in Fig. 25 by the spring 51 connecting it with the frame and its lower left hand corner has a notch 52 adapted to receive the upper right hand edge of a lever 53 which is fulcrumed on a stud 54 projecting from bracket 22 and is normally pulled upwardly by a strong spring 55 connecting it with web 2. The lever 53 has a depending portion 56 adapted to withdraw the bolt 36 from engagement with clutch member 34 when the bolt, rotating with clutch member 23, engages part 56, said part 56 at that time wiping against an inclined surface 57 formed in a recess 58 in the bolt. Lever 53 carries at its rear end an anti-friction roller 59 adapted to be engaged by the hump 25 for the purpose of resetting lever 53 in the position where it is locked by lever 44 with its portion 56 ready to withdraw the bolt 26. On the stud 54 is also fulcrumed a lever 60 carrying an anti-friction roller 61 at one end and at its other end being connected with the extension 45 by a link 62. Thus, when the attendant places three bottles in the position indicated by the dotted outline thereof in Fig. 2 and turns the turret through one-sixth of a revolution to bring the bottles on the pads *v*, one of the teeth *j* engages extension 45 of lever 44, rocking the latter until extension 45 engages the stop 47; lever 53 is thus tripped and releases the bolt 26, so that parts 23 and 34 are clutched together and shaft 21 rotates and thus causes a rise and fall of the plungers *u*. During the rising and falling movements of the plungers, the bottles have had their caps attached, by the mechanism to be described. As the hump 25 on clutch member 23 sweeps around, it engages the rollers 59 and 61, thus resetting lever 53 (which is locked in this position by the lever 44) and vibrating lever 60 so that its extension 45 is drawn downward momentarily, rising again under the tension of its spring as soon as the hump clears roller 61. When the extension 45 rises, it does so back of the tooth which last caused the oscillation of lever 44, so that the turret is again free for another advance, for the purpose of removing the bottles just closed and bringing into position three other bottles to be closed. Meanwhile, clutch member 23 continues to rotate until its bolt again wipes against the portion 56 of lever 53, whereupon it is withdrawn, the clutch members are unlocked and shaft 21 and the parts controlled thereby come to a standstill. It will thus be seen that the attendant has nothing to do but advance the bottles in the turret to the sealing position; each such advance causes the discharge or removal of bottles last previously closed. A guide for the bottles may be formed by a plate 62′ pivoted in the levers 63 fulcrumed in a bracket 64 bolted to the table and having their lower ends pressed outwardly by spiral spring 65, in such manner that the upper ends of the levers, and hence the plate 62′, are normally forced in the direction of the head *d*.

Secured to the front of the head *d*, over the pads *v*, by bolts 66 penetrating slots 67, is an upright 68 which carries at its upper end a casting 69 (see Figs. 6, 7 and 8). This casting is formed with a bearing 70 in which and a bearing 71 in a hopper 72 carried by the casting, is journaled a horizontal shaft 73 which is rocked by the following means. A pinion 74 is fixed on shaft 73 and freely arranged on the shaft is a guide 75 which retains a rack 76 in engagement with the pinion and allows the rack to oscillate with reference to the shaft (Figs. 17 and 18). This rack forms the upper end of a pitman 77 which at its lower end is connected to a crank pin 78 on a face plate 79 fixed on a shaft 80, journaled in frame *a*, which carries a gear 81 meshing with the pinion 33.

The casting 69 has at the back a wall 82 forming the front wall of the hopper and leaving an opening 83 at the front lower portion of the hopper, so that the caps which are placed in the hopper will by gravity find their way through the opening 83. The front of the casting 69 has a vertical groove 84 in which is set a slide or carrier 85 substantially shaped like an open rectangular box, with its open side out and its top surface 86 inclined downwardly. This slide is covered by another box 87 open at the back, top and bottom, said box 87 forming a guide for the slide 85. The casting has the projecting ribs 88 and 89, the latter diverging upwardly from the box 87, as shown in Fig. 8. A sheet metal lining piece 90 having its upper end of dove-tail form and fitting between the ribs 89 and its upper extremity turned back over the box 87 and then formed with an opening 91, corresponding in size to the end elevation of the slide 85, is arranged between the slide and the front of the box 87. This slide carries at its upper end a coupling 92 to which is connected a chain 93 attached to the grooved pulley 94 on shaft 73. Thus, in the oscillations of the shaft the slide, which falls until its top surface 86 alines with the bottom surface of the opening 93, will intermittently elevate the caps which will accumulate on it in its depressed position, causing them to be discharged through the opening 91 forwardly on account of the incline of the surface 86.

Against the ribs 88 and 89 is bolted the substantially circular plate 95 shown in rear elevation in Fig. 9 and in front elevation in Fig. 10. This plate has an opening 96 at the top through which the caps raised by the slide 85 fall, the lower side of the opening having a rearwardly projecting lip 97 and below the lip a ledge 98. This plate further carries the stub shaft 99 on which is journaled a disk 100. The front face of the plate 95 has a groove 101 following the arc of a circle described about the shaft 99. The rear face of the disk 100 has a circular rib 102 which mates with the groove. Referring to Figs. 12 and 13 it will be seen that the deepest part of the groove adjoins its outer perimeter. A cap located between the disk and plate can pass through the downwardly sinuous course formed between them by their mating rib and groove only when its open and wider side is to the front. A cap having its open side face to the back could not pass because its wider diameter being then at the back, the cap cannot take the bend formed in the passage; it therefore rests with its periphery on the shoulder 103 at the outside of the groove. Caps which thus fall off the ledge 98 between the disk and plate with their open sides to the front fall downward between them, into the chutes to be described; those facing with their open sides to the back are rejected or checked at the bend formed in the passage afforded beween the plate and disk, to be rectified by the following means;

A ball or the like 104 is arranged in the disk in such manner as to project through the rib portion thereof, being held in place by a plate spring 105; two other such balls 106 are shown in Fig. 11, (but omitted in Fig. 6), their function being to coöperate with the ball 104 principally to steady the disk. The disk is rocked from shaft 73 by means of a belt 107 extending around the pulleys 108 and 109, on the hub of the disk and the shaft 73, respectively, and, the space between the disk and plate being kept well occupied with caps by the slide 85, the rocking disk agitates the caps and tends to raise the upper one adjoining its rib and force them under deflector plates 110 which are secured to plate 95 over slits 111 through which the caps are designed to pass. In this action, the disk is more or less positively assisted by the ball 104, the deflector plates 110 being formed with slits 112 to admit the ball.

113 is a deflector on each plate 110 formed to enter the slit 111 and to direct the caps through said slits. Below the slits 111 and farther from the center of the plate are other slits 114 through which the caps re-enter between the plate 95 and disk 100. The back of the plate 95 is formed with curved projections 115 extending from the bottom of the slits 111 to the top of one of the slits 114, and each of these is covered by a similarly curved piece 116 which is secured to the plate and thus forms with the part 115 a guideway for the caps; the curved piece 116 may have cast therewith a plate 117 which will give the guideway a third side, that is, since the parts are so constructed and arranged that the guideways are oblique, each plate 117 will constitute the bottom of the guideway. It will be apparent, in view of the foregoing, that caps forced into the guideway through slits 111 and passing through the same and leaving by the slits 114 will be reversed or rectified. They will then be adapted to fall between the plate 95 and the disk unchecked thereby. The casting 69 is recessed at 118 to receive the guides referred to.

A cross piece 119 is secured to the casting 69 and depending from it are three chutes 120; the passages in these chutes coincide with three openings 121 which are formed in a flange 122 on plate 95 preventing the escape of any of the caps from between the plate and disk except at the openings. These chutes are deflected inwardly at the bottom, as shown in Figs. 6, 21 and 23 and each terminates in a block 123 to which is pivoted another block 124 provided with spring actuated clips 125 arranged at both sides of an opening 126 in block 124 to receive the bottle mouths, said clips being adapted to hold each cap squarely over the bottle mouth; it will be understood that the weight of the caps in the chutes presses the lowest cap within the grip of the clips. In lieu of the cap-holding means afforded by block 124 and clip 125 we may employ the cap-holding means shown in Fig. 19, where the block 127 has clips 128 arranged on parallel axes in opposing relation to each other and formed with opposed jaws 129 to receive the caps upon discharge from the chutes; the back flat face of each jaw is impinged against by a plate spring 130 each set at an incline in a recess 130′ in the side of the block, the jaws thus yielding vertically to the passage of the bottle head. Above the block 123, which may be secured to the part 68 by the bracket 131, and spacing part 123 from part 68 is the socket 132 of the sealing head, the stem 133 of which extends into the part 68 and is held therein by set screw 134. In the bore of the stem is set screw 135, between which and a sliding plug 136 is interposed a spiral spring 137. The plug 136 is guided in a slitted flanged ring 138 set in the socket 132. Against this ring bears the ring 139 having an internal annularly arranged series of sockets 140. In these sockets are fulcrumed the jaws 141, each jaw being arranged in a slit of the part 138, one end thereof being engaged by the plug 136 and the other end thereof projecting downwardly and being adapted to bend the flange of the bottle cap into interlocking relation with the shoulder B of the bottle head. As the bottle is raised by the mechanism already described and its mouth impinges against a cap held in the jaws of clips at the corresponding chute 120, the cap is thrust upwardly against the jaws 141 which are engaged in the plug 136. If the height of any bottle requires it, the friction grip member in the bottle elevating means will allow the plunger carrying said bottle to yield relatively to the elevating means. Ultimately, the pawl of the particular elevating means will engage the rack thereof and effect a positive upward movement of the plunger with the friction grip member. In the present adaptation this positive movement of the plunger is mainly operative on the jaws 141 the same being moved on their fulcrums to effectively clamp the caps on the bottles A; but we do not wish to be limited to the employment of such means, inasmuch as it is apparent that the friction-grip can be adjusted so that a sufficient locking of the cap to the bottle may be acquired by the friction-grip alone, depending of course, upon the qualities of metal employed in the caps, the degree of pressure in the bottles, etc., such friction-grip in that instance performing the double service of effecting compensation for varying bottle heights and sealing. By employing the friction-grip to effect the compensation, the operation is not subject to the danger attending the use of a spring or the like which practice has demonstrated is likely to cause the fragments of glass on the breaking of a bottle to be dispersed with great force.

We are aware that it is old to bring frictional action to play in the sealing of bottles or the like by a conical or other inclined surface directly or indirectly operative upon the flange, say, of the closure. We are also aware that it is old to check the compensating yield of one of the members whereby the body and closure parts of a container are brought into closed relation by means in the nature of a cam operating frictionally but without slip, on such member. Our invention distinguishes from the former of these in that it involves a grip-action operative in compensating for varying heights of containers rather than in the affixing operation, *per se*, and from the latter in that the grip-action characterizing our invention is one which is a slip-friction grip-action normally operative during the working thrust to oppose the longitudinal movement of the part subject to such action relatively to the member affording it.

Having thus fully described our invention, what we claim and desire to secure by Letters Patent is:—

1. In a machine for affixing the closure part to the body part of a container, the combination of an affixing means, and means for effecting the movement of one of said parts into contact with the other, comprising a slip-friction grip-member normally operative during the working thrust to oppose the longitudinal movement of the container relatively to said member, substantially as described.

2. In a machine for affixing the closure part to the body part of a container, the combination of an affixing means, and means for effecting a thrust-movement of the container relatively to the affixing means comprising a container-support and a slip-friction grip-member normally operative during the working thrust to oppose the longitudinal movement of the container-support relatively to said member, substantially as described.

3. In a machine for establishing the body and closure parts of a container in closed relation, the combination of a container-support, and a slip-friction-grip support-elevating member normally operative during the working thrust to oppose the longitudinal movement of the container-support relatively to said member, substantially as described.

4. In a machine for establishing the body and closure parts of a container in the closed relation, the combination of a container-support, a slip-friction-grip support-elevating member normally operative during the working thrust to oppose the longitudinal movement of the container support relatively to said member, and means for limiting the downward movement of the container-support with said member, substantially as described.

5. In combination, a means adapted to take the thrust of the container, moving means adapted to effect the thrust, one of said means comprising members assuming the resistance of the container and having the one a slip-friction-grip on the other, and mechanism for positively interlocking said members upon a predetermined amount of yield of one member relatively to the other.

6. In combination, with the frame, a means adapted to take the thrust of the container, moving means adapted to effect the thrust, said moving means comprising members assuming the resistance of the container and having the one a friction-grip on the other and also having the one a rack and the other a pawl, said pawl being normally adapted to engage the rack, and a part carried by the frame and acting to hold said pawl unengaged with the rack during a part of the movement of said moving means, substantially as described.

7. In a mechanism for delivering articles having relatively limited thickness in such manner that the articles will only issue from said mechanism with their corresponding faces similarly disposed, a selecting mechanism comprising members having substantially parallel walls spaced approximately a distance apart corresponding with the thickness of the articles and having the one a rib and the other a groove mating with each other and forming a bend in the space between said members, and one of said members being movable substantially in the direction of the length of said rib and groove, substantially as described.

8. In a mechanism for delivering articles having relatively limited thickness in such manner that the articles will only issue from said mechanism with their corresponding faces similarly disposed, a selecting mechanism comprising members having substantially parallel walls spaced approximately a distance apart corresponding with the thickness of the articles and having the one a rib and the other a groove mating with each other and forming a bend in the space between said members, and one of said members being movable substantially in the direction of the length of said rib and groove, and a projection on the movable member located substantially at the bend, substantially as described.

9. In a mechanism for delivering articles having relatively limited thickness in such manner that the articles will only issue from said mechanism with their corresponding faces similarly disposed, a rectifying mechanism comprising members spaced approximately a distance apart corresponding with the thickness of the articles and having portions forming a bend in the space between said members, one of said members being revoluble substantially in its own plane, and the other member having outlet and return openings therein for the articles, and means, communicating with said openings, for reversing the articles checked at said bend, substantially as described.

10. In a mechanism for delivering articles having relatively limited thickness in such manner that the articles will only issue from said mechanism with their corresponding faces similarly disposed, a rectifying mechanism comprising members spaced approximately a distance apart corresponding with the thickness of the articles and having portions forming a bend in the space between said members, said bend extending in the arc of a circle, and one of said members being revoluble concentrically with said bend and having a projecting device adapted to agitate the articles checked at said bend and the other member having outlet and return openings therein for the articles and the former being in the path of movement of said agitating device, and means, coöperative with the revoluble member, for reversing the articles checked at said bend, substantially as described.

11. The combination of a suitable support, a driving part, a driven part, a member adapted to interlock said parts and normally standing in the interlocking relation, a device movable into and out of the path of rotary movement of said member with the driven part and adapted to cause and maintain its withdrawal from the interlocking position, mechanism adapted to operate upon the containers and actuated from the driven part and means, comprising a movable container-receiving part, for controlling the position of said device, substantially as described.

12. In a machine substantially of the character described, a supply means for the articles having an inclined supporting surface for the articles, a device movable up and down across the plane of said surface and having an inclined supporting surface, and means for confining the articles on the surface of said device while the same is being moved, said means having a discharge for the articles on the side adjoining the low end of its inclined surface, substantially as described.

13. The combination, with a supply hopper for the articles having a lateral discharge, of a vertically reciprocating carrier having an inclined supporting surface for the articles, and vertical means, communicating with said discharge of the hopper, for confining the articles on said surface of the carrier during its vertical movement.

In testimony, that we claim the foregoing, we have hereunto set our hands, this 2nd day of February, 1910.

BENJAMIN ADRIANCE.
AMOS CALLESON.

Witnesses:
WILLIAM C. HORN,
CHARLES R. GAY.